US009646626B2

(12) United States Patent
Dimitriadis et al.

(10) Patent No.: US 9,646,626 B2
(45) Date of Patent: May 9, 2017

(54) SYSTEM AND METHOD FOR NETWORK BANDWIDTH MANAGEMENT FOR ADJUSTING AUDIO QUALITY (71) Applicants: AT&T Intellectual Property I, L.P., Atlanta, GA (US); AT&T Mobility II LLC, Atlanta, GA (US)

(72) Inventors: Dimitrios Dimitriadis, Rutherford, NJ (US); John Crockett, Liberty Hill, TX (US); Horst Juergen Schroeter, New Providence, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 95 days.

(21) Appl. No.: 14/087,814

(22) Filed: Nov. 22, 2013

(65) Prior Publication Data
US 2015/0149159 A1 May 28, 2015

(51) Int. Cl.
*G10L 21/0208* (2013.01)
*G10L 15/20* (2006.01)
(Continued)

(52) U.S. Cl.
CPC ....... *G10L 21/0208* (2013.01); *H04M 3/2236* (2013.01); *H04M 3/18* (2013.01); *H04M 2201/40* (2013.01)

(58) Field of Classification Search
CPC ......... G10L 15/20; G10L 17/20; G10L 19/00; G10L 19/012; G10L 19/008; H03M 7/30
(Continued)

(56) References Cited

U.S. PATENT DOCUMENTS 4,780,885 A  10/1988  Paul et al.
5,130,982 A   7/1992  Ash et al.
(Continued)

FOREIGN PATENT DOCUMENTS

CA    2117587    3/1995
CA    2371015    10/2000
(Continued)

OTHER PUBLICATIONS

Moreno, Pedro J., and Richard M. Stern, "Sources of degradation of speech recognition in the telephone network," IEEE International Conference on Acoustics, Speech, and Signal Processing (ICASSP-94), vol. 1, 1994.
(Continued)

*Primary Examiner* — Huyen Vo
*Assistant Examiner* — Rodrigo Chavez (57) ABSTRACT Disclosed herein are systems, methods, and computer-readable storage devices for processing audio signals. An example system configured to practice the method receives audio at a device to be transmitted to a remote speech processing system. The system analyzes one of noise conditions, need for an enhanced speech quality, and network load to yield an analysis. Based on the analysis, the system determines to bypass user-defined options for enhancing audio for speech processing. Then, based on the analysis, the system can modify an audio transmission parameter used to transmit the audio from the device to the remote speech processing system. The audio transmission parameter can be one of an amount of coding, a chosen codec, an amount of coding, or a number of audio channels, for example.

20 Claims, 5 Drawing Sheets (51) Int. Cl.
    *G10L 17/20*     (2013.01)
    *G10L 19/00*     (2013.01)
    *H04M 3/22*     (2006.01)
    *H04M 3/18*     (2006.01)

(58) Field of Classification Search
    USPC ....... 704/201, 203, 206, 226, 233, 500, 501,
    704/502, 503, 504
    See application file for complete search history.

(56) References Cited

U.S. PATENT DOCUMENTS

| | | | |
|---|---|---|---|
| 5,537,435 A | 7/1996 | Carney et al. | |
| 5,640,415 A | 6/1997 | Pandula | |
| 5,666,651 A * | 9/1997 | Wang | H04W 84/022 |
| | | | 455/450 |
| 5,848,097 A | 12/1998 | Carney et al. | |
| 5,926,483 A | 7/1999 | Javitt | |
| 6,230,123 B1 * | 5/2001 | Mekuria | H03G 3/32 |
| | | | 704/226 |
| 6,901,259 B2 | 5/2005 | Dorenbosch | |
| 7,613,270 B2 | 11/2009 | Komaili et al. | |
| 7,898,993 B2 | 3/2011 | Dawson et al. | |
| 8,473,992 B2 | 6/2013 | Nakano | |
| 2002/0091527 A1 | 7/2002 | Shiau | |
| 2002/0188896 A1 | 12/2002 | Filteau et al. | |
| 2007/0171027 A1 * | 7/2007 | Slevin | G07C 9/00158 |
| | | | 340/5.52 |
| 2009/0281800 A1 * | 11/2009 | LeBlanc | G10L 21/0208 |
| | | | 704/224 |
| 2009/0299740 A1 * | 12/2009 | Jeong | G10L 19/265 |
| | | | 704/226 |
| 2011/0202333 A1 | 8/2011 | Abir | |
| 2011/0250932 A1 * | 10/2011 | Cohen | H04R 1/1016 |
| | | | 455/569.1 |
| 2012/0177217 A1 * | 7/2012 | Schmidt | H04L 1/0001 |
| | | | 381/80 |
| 2013/0103398 A1 * | 4/2013 | Rauhala | H04R 29/00 |
| | | | 704/233 |
| 2014/0079244 A1 * | 3/2014 | Vrazic | G10K 11/16 |
| | | | 381/94.1 |

FOREIGN PATENT DOCUMENTS

| | | |
|---|---|---|
| CA | 2510663 | 6/2003 |
| GB | 553290 | 5/1943 |
| GB | 1473552 | 6/1974 |
| KR | 20000015093 | 3/2000 |
| KR | 20040045798 | 11/2002 |
| WO | WO 9526094 | 9/1995 |
| WO | WO 2009051959 | 4/2009 |

OTHER PUBLICATIONS

Tan, Zheng-Hua, Paul Daisgaard, and Borge Lindberg, "Automatic speech recognition over error-prone wireless networks," Speech Communication 47.1, pp. 220-242, 2005.

Bernard, Alexis, and Abeer Alwan, "Low-bitrate distributed speech recognition for packet-based and wireless communication," IEEE Transactions on Speech and Audio Processing 10.8, pp. 570-579, 2002.

James, A.B. and B.P. Milner, "An analysis of interleavers for robust speech recognition in burst-like packet loss," IEEE International Conference on Acoustics, Speech, and Signal Processing, vol. 1, 2004.

Haeb-Umbach, Reinhold, and Valentin Ion, "Soft features for improved distributed speech recognition over wireless networks," Interspeech, 2004.

* cited by examiner

SYSTEM AND METHOD FOR NETWORK BANDWIDTH MANAGEMENT FOR ADJUSTING AUDIO QUALITY

BACKGROUND

1. Technical Field

The present disclosure relates to speech processing and more specifically to suppressing ambient noise to improve audio quality for speech processing.

2. Introduction

Most, if not all, current Human-Computer Interface (HCI) systems and/or audio-enabled communication devices, such as cell-phones or conference systems, provide some sort of signal processing during the audio capture stage to suppress ubiquitous ambient noise. Suppressing ambient noise can enhance audio quality and clarity. However, when suppressing ambient noise, special care should be taken to ensure that the signal processing does not negatively impact performance of speech-related services based on Automatic Speech Recognition (ASR). Thus, devices attempt to suppress noise as much as possible without deteriorating audio quality. On-device audio processing presents additional challenges relating to energy consumption, computational efficiency, and device capabilities. Many different devices use different noise reduction algorithms or different degrees of noise reduction even if using identical algorithms, which can lead multiple device-specific ASR models to increase performance. This approach creates significant duplication of effort and increases costs.

DETAILED DESCRIPTION

Figure 1:
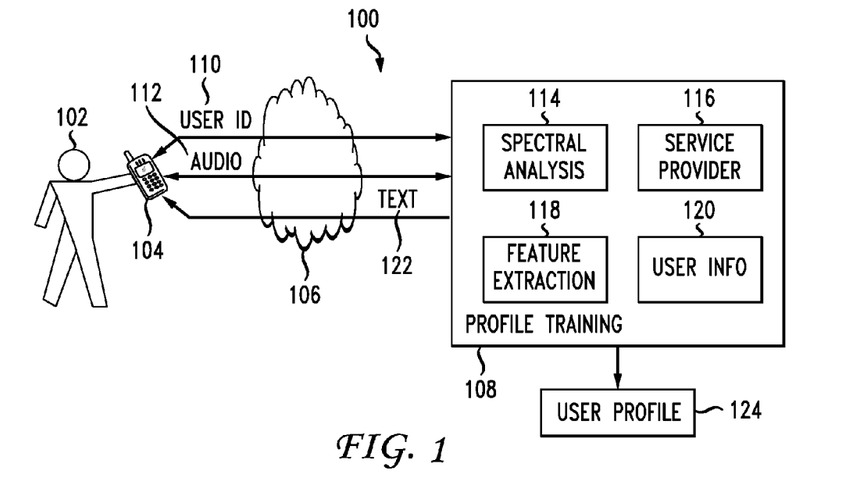
FIG. 1 illustrates an example system architecture for generating a user profile.

The approach disclosed herein enhances captured audio over a network with personalization. At first, a training phase is required for the proposed system to "learn" and record the speech characteristics of any first-time user as a user profile. FIG. 1 illustrates an example system architecture 100 for learning about users and generating user profiles. The profile training system 108 can perform this training or user registration process once (or more than once) for each new or unregistered user 102. The system either provides a user ID 110 to a communication device 104 of the user 102 over a network 106, or prompts the user 102, via an audio signal 112 or displayed text, to enter a user ID 110. Then the profile training system 108 prompts the registering user 102 to read aloud a predefined text 122 to generate an audio signal 112 sent back to the training system 108. The predefined text can be suitably selected to contain all of the existing phonetic units. During this training phase, the profile training system 108 learns the phonetic units uttered and adjusts the configuration of the spectral analysis 114 and feature extraction 118 accordingly to let this specific user's signal "pass" unaltered through the process while suppressing every other sound source. The profile training system 108 can also gather and store user information 120 such as contact information, demographic data, credentials, address, personal data, and so forth, from the user 102. The profile training system 108 can reside across a network operated or maintained by a service provider 116, and can be completely transparent to the user, who only reads aloud the provided text 122 through the communication device 104 and then continues to use the communication device 104 as usual. Therefore, the learning process is device-independent and can be initialized by any device capable of capturing audio, such as a mobile phone, tablet, laptop, desktop computer, wearable computing device, and so forth. The profile training service or system can also reside in the user's device wholly or partially.

More than one user can register using the same device, but each user should independently identify themselves accordingly. Alternatively, the communication device 104 or a server can perform speaker identification between a small group of users to determine which, if any, of the users is speaking. The profile training system 108 generates and stores user profiles 124 for later use. The system can use user profiles 124 regardless of the end-point device, provided that the respective user's profile information is available to the communication server. After the above registration process, the system can be used at will, or engaged automatically when needed, such as when the user is speaking in a noisy environment like an airport terminal or a construction site. The user can control and engage the speech processing enhancements on-demand, such as by pressing a button.

User's voices may change over time, such as due to short-term voice changes by a cold or flu, or long-term voice changes due to aging or more permanent diseases. The system can transparently add features to the training speech segments whenever the registered user's raw speech is considered of high quality, thus, keeping track of any voice changes. The system can update the users' profile every time a significant change of the respective user's voice is perceived. For example, when speech above a certain clarity or quality is received, the system can add that speech to the user profile or replace lower quality speech with the new speech. The system can add to a user's profile all received speech above a certain clarity threshold and/or quality threshold. Further, a user can initiate at will a re-profiling/retraining process, such as via a button press, selecting an option via a menu, or configuring a setting in the local device or a network-based server. For example, the user can read a predefined text passage, covering all necessary phonetic units, so the system can learn the user's voice characteristics, and set up a dedicated personalized speech profile. From this point on, the system can treat all other audio components as noise and suppress them accordingly.

Figure 2:
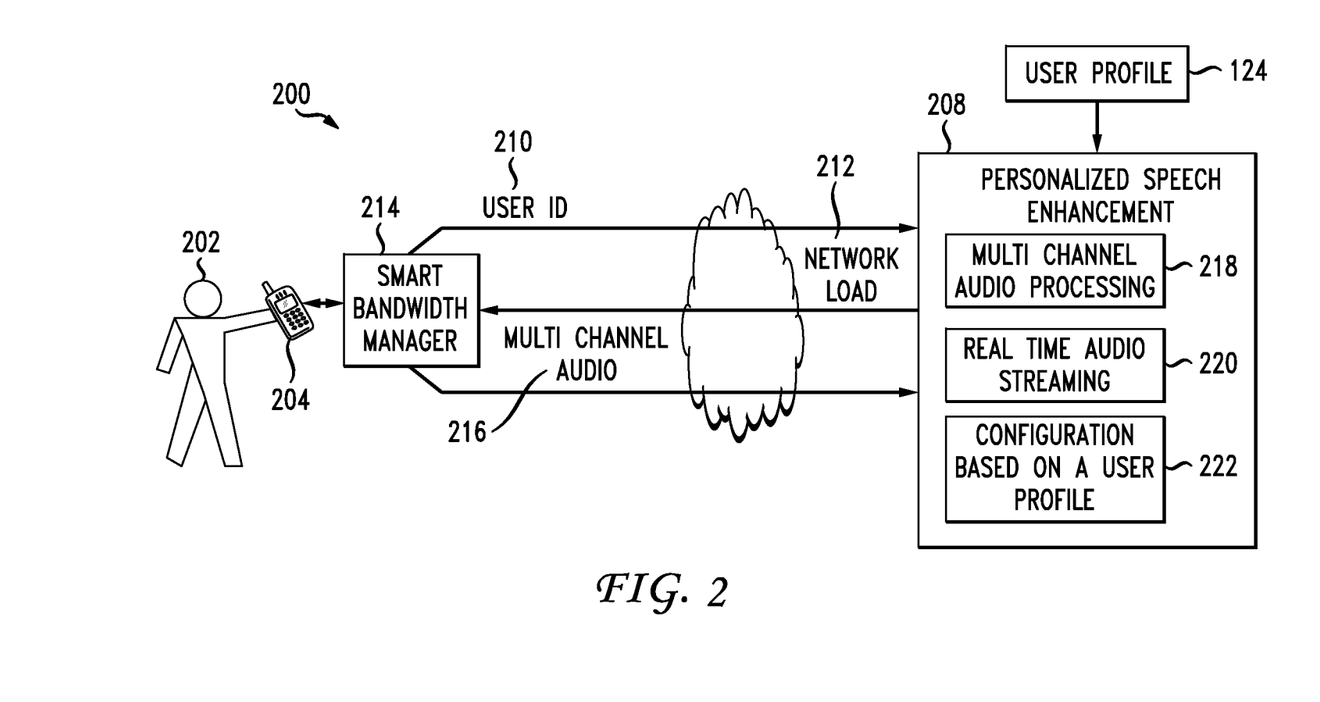
FIG. 2 illustrates an example system architecture for enhancing audio using a user profile.

Once the profile training system 108 generates the profile 124, that profile 124 is provided to a personalized speech enhancement system 208, as shown in the example architecture of FIG. 2. A smart bandwidth manager (SBM) 214 can reconfigure the audio transmission details, such as the amount of coding, the number of transmitted audio channels 216 (or even a single audio channel), which codecs are used, etc., in real-time based on the ambient noise conditions, the need for enhanced speech quality, or the network load 212 at any given moment. These factors can change over time, and so thus can the SBM 214 adapt any factor of the audio accordingly. For example, if the amount of available bandwidth suddenly decreases, such as when the user 202 moves the device 204 out of LTE cellular reception to an area of 3G cellular reception, the SBM 214 can reduce the number of audio channels transmitted to the personalize speech enhancement system 208. Conversely, if the user 202 is interacting with an app or service that has higher audio accuracy requirements, the SBM 214 can increase the number of audio channels, increase the quality of the coding, use a higher-quality codec, and so forth, for the duration of the use of that app or service. The personalized speech enhancement system 208 can include a module or processor for multi-channel audio processing 218 and for real time audio streaming 220.

The SBM 214 can transmit a user ID 210 to the personalized speech enhancement system 208 to identify which user profile 124 to apply to the multi-channel audio 216. The personalized speech enhancement system 208 can look up a configuration 222 based on the user profile 124. In another example, a speech-based service, such as an ASR-based mobile search application, can choose to bypass user-defined options in the user profile 124 for the audio-enhancing service in order to get the best-available audio quality, ensuring the best possible ASR performance. The system can override user preferences based on settings in an application, based on location, based on time, etc. In one example the system can increase the number of audio channels for locations and times that are known or expected to be extremely loud, such as in a sports arena during a game. Such an application or situational trigger can establish a "full-throttle" data channel where all the available audio channels and audio enhancing modules have been activated regardless of available bandwidth or user settings.

The personalized speech enhancement system 208 can provide improved audio quality based on a personalized speech enhancement module. The same system guarantees that this improved audio quality is achieved with the least possible bandwidth consumption. The SBM 214 can communicate with or monitor the network to determine network load 212 information. Network load 212 information can include processing load of the personalized speech enhancement module 208 as well as available bandwidth, latency, and other communication characteristics. The SBM 214 can change the location of the acoustic or other processing tasks from the device 204 to the network-based personalized speech enhancement system 208 or vice versa in order to maximize user experience, reduce network traffic, or to increase handheld device battery life.

As soon as the system is trained, the user can activate the personalized speech enhancement system in real-time. In order to take advantage of device-independence, the user profile 124 can be stored in a network-based location so the personalized speech enhancement system 208 can access it for any user device 204. Therefore, the user 202 can switch devices 204 without retraining his or her user profile 124. Because the system resides in a network, the on-device footprint is minimal. Thus, the speech enhancements can be scaled up easily. Finally, the SBM 214 can track the noise conditions at the user 202 and device 204 and decide how many of the available audio channels should be transmitted to the personalized speech enhancement system 208. The SBM 214 can determine that it is not necessary to transmit more than one channel when noise levels are very low, allowing the allocation of the available bandwidth to other services or saving bandwidth in the network for other demands. Further, The SBM 214 can reconfigure in real-time other audio capturing parameters, such as the amount of compression/coding, the sampling frequency (broadband vs. narrowband audio), and so forth.

Disclosed herein are systems and methods for suppressing ambient noise and enhancing audio quality, such as in audio captured at a mobile device. An example system can simultaneously capture and combine individual audio channels to mitigate ambient noise conditions and enhance the user's speech signal using only a minimum number of necessary audio channels to ensure acceptable audio quality. Further, handling noise suppression in the same way for all devices, for example, "centrally" in the network, can provide other benefits.

Figure 3:
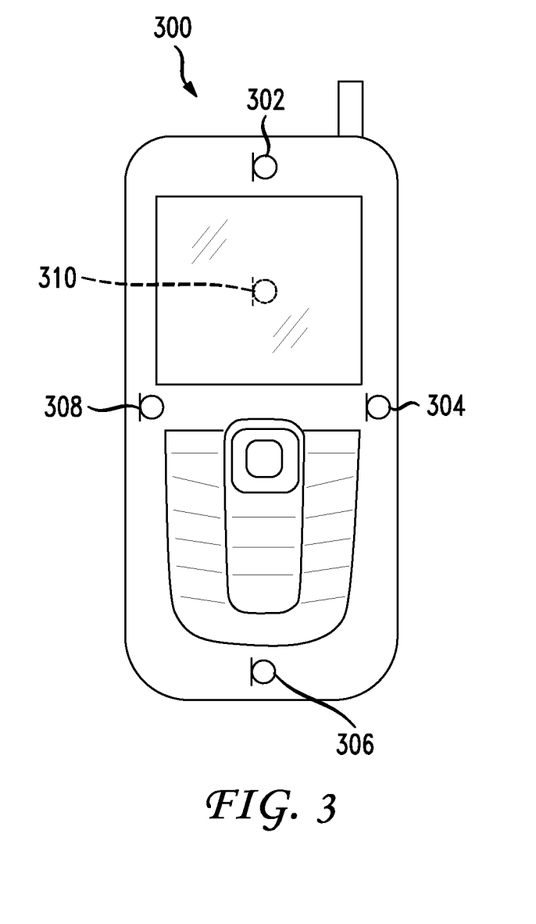
FIG. 3 illustrates an example mobile device with multiple speakers.

Many mobile devices, such as the example mobile device 300 shown in FIG. 3, include more than one microphone 302, 304, 306, 308, 310 to enable simultaneous audio capture and enhanced audio quality from combining individual audio channels. The example mobile device 300 shows example locations for the microphones, but additional microphones or fewer microphones can be used. One or more of the microphones can also be in another position. The microphones can be located within the device, or can be located within other nearby 'companion' devices, such as in a car, a desktop computer, or a nearby user's device. In order for a central, network-based recognizer to take advantage of the multiple microphones, the recognizer would need access to the audio signal of each microphone. Thus, the device can provide the audio channels to the recognizer as multichannel audio in combined data streams, which would require increased bandwidth.

The system can incorporate audio streams from other devices, as well. For example, in a car-scenario, the system can incorporate audio streams from in-car microphones as well as in-device microphones. In an office environment, the system can incorporate audio streams from a desk phone, a microphone from a webcam, as well as microphones in a mobile device. Similarly, in a living room environment, the system can incorporate audio streams from microphones attached to or associated with a gaming console, in-home monitoring, intercom, or surveillance equipment, tablets, other smart phones, and so forth. The system can determine which microphones are nearby, and determine network conditions for each microphone separately. For example, data from a microphone integrated into a smartphone will travel through a different network than data captured from a webcam through a computer with a wired internet connection. Thus, the amount of audio channels, the types and amount of coding, and other characteristics for transmitting the audio data may vary for each microphone. In some cases, the network conditions may vary so much that the system can redirect traffic from one network connection to another. For example, if the cellular connection is particularly bad, but a reliable and fast wired connection is available via a nearby desktop computer with a microphone, the system can arrange for the cell phone to record multiple audio channels, and relay the audio data to the desktop computer, such as via Bluetooth or other networking technology, for transmission to the personalized speech enhancement system 208.

The example communication server operates not on the local device gathering the audio, but on a computing device or server residing across the network from the local device, and can act as an intermediate system between the end-device that captures the audio and the server that establishes the bidirectional communication channel. When the communication server recognizes or registers the user and estimates the ambient noise conditions and characteristics, the communication server can adapt its configuration accordingly, to enhance the user's speech signal using just the necessary channels of audio to ensure acceptable audio quality. Thereby, the communication server can greatly reduce the required channel bandwidth. For example, if one of the audio channels is not needed, the device can withhold that audio channel, and reduce the required bandwidth to transmit audio to the system. In addition, the communication server can reconfigure the consumed bandwidth based on the current network load, by either enhancing or degrading the audio quality accordingly.

The example communication server can include a "Smart Bandwidth Manager" (SBM), and a "Personalized Speech Enhancer" (PSE). The SBM can decide the audio coding configuration and how many of the available audio channels should be transmitted to the communication server. The communication server can determine that audio quality improves with an increased number of microphones used, with great dependence on the actual noise conditions. The PSE is trained to enhance the user's speech as well as to suppress the rest of the audio noise components, and thus, greatly improve the captured speech quality. Because the communication server performs audio processing in the network, the speech enhancement algorithms can be faster, more scalable, and more easily reconfigurable and upgradeable, thus prolonging the device's battery life and reducing demands for bandwidth, while significantly reducing the end-device's processing requirements compared to doing all the processing on-device.

This solution can ensure that the quality of processed audio is more consistent across different devices and noise conditions because the audio processing is device-independent and can provide increased performance of ASR services without costly individualized ASR models.

Four scenarios are provided to illustrate example usage scenarios for the personalized speech enhancement system 208. In a first scenario, a user buys a new LTE smartphone 300 with 5 microphones, as shown in FIG. 3, and sets up the audio enhancing service with the personalized speech enhancement system 208. Then, the user reads 10 lines of text provided to the screen of the smartphone 300 while the device captures and processes the audio to create the training data set. When the training phase is finished, a network-based storage stores the user's profile and makes the profile available to the personalized speech enhancement system 208. Later, the user is in a noisy metropolitan environment, such as Manhattan, for business purposes. He starts a call while in a taxi. The noise level is quite low and the SBM 214 configures the device to transmit only one channel to the server, thus conserving link bandwidth. The personalized speech enhancement system 208 is able to deal with this level of noise, delivering crystal-clear audio to the other end of the line via the real time audio streaming module 220. During the call, the user steps out of the taxi and starts walking on the sidewalk.

On the sidewalk, the noise from the traffic, other people talking, and general ambient noise is so prominent that the other party on the call can hardly hear him talking. Immediately, the SBM 214 decides that all 5 audio channels should be transmitted to increase call clarity. Perhaps 2, 3, or 4 channels are all that is needed for an acceptable level of performance or call clarity. As soon as these channels reach the PSE 208, the PSE 208 filters out the noise and again, only the user's voice is clearly audible at the other end. The PSE 208 can actively filter out all other sound signals but the user's voice so the other party can clearly hear him.

In a second scenario, the user downloads a new application to be used as a "Virtual Assistant", where the user utters a command and the device performs the requested action. Such applications are usually employed while walking or driving or in other "hands-free" settings, where background noise can greatly deteriorate ASR performance. In this scenario, the virtual assistant application "knows" the user's speech profile, which can contain information about the user's speech "fingerprint". The virtual assistant applicant can automatically retrieve the speech profile 124 and enable or signal the PSE 208 to use the speech profile 124. Eventually the user will decide to upgrade his mobile phone and buy a different or newer model. Because the speech profile 124 resides in a network-based location and is device-independent, the virtual assistant application does not need to be altered or retrained. The ASR performance of the virtual assistant application remains unaffected, even on the new phone, or a replacement or a secondary device. As long as the PSE 208 improves audio quality and the ASR performance is improved, the user remains satisfied with his experience and he continues using the virtual assistant application.

In a third scenario, the user uses his smartphone during a time when the network is not fully loaded. The SBM 214 consults with the network to determine the network load 212, and then determines to increase the number of channels, increase sampling rates, and/or reduce the compression/coding in order to provide increased audio performance to the user. In this way, the SBM 214 can take advantage of available network capacity to provide enhanced services, and can reduce network usage in times of congestion for applications that do not require heightened clarity or for users in environments that are sufficiently quiet or clear.

In a fourth scenario, the user uses his smartphone. The SBM 214 makes a determination to change processing tasks (acoustic or other) from a network-based recognizer via the PSE 208 to the device 204 or from the device 204 to a network-based recognizer via the PSE 208. The SBM 214 can make decisions to transfer recognition or other speech processing tasks based on available resources or capabilities of the device 204, such as battery life, available codecs, CPU type, storage space, available RAM, and so forth. For example, the SBM 214 can shift speech processing tasks away from the device 204 in order to maximize handheld battery life. In another aspect, the system can record on the device 300 audio from one or more of the microphones and transmit it serially (rather than in parallel) to an ASR server for processing the audio command. That way all of the audio data is used, but there is a delay.

Figure 4:
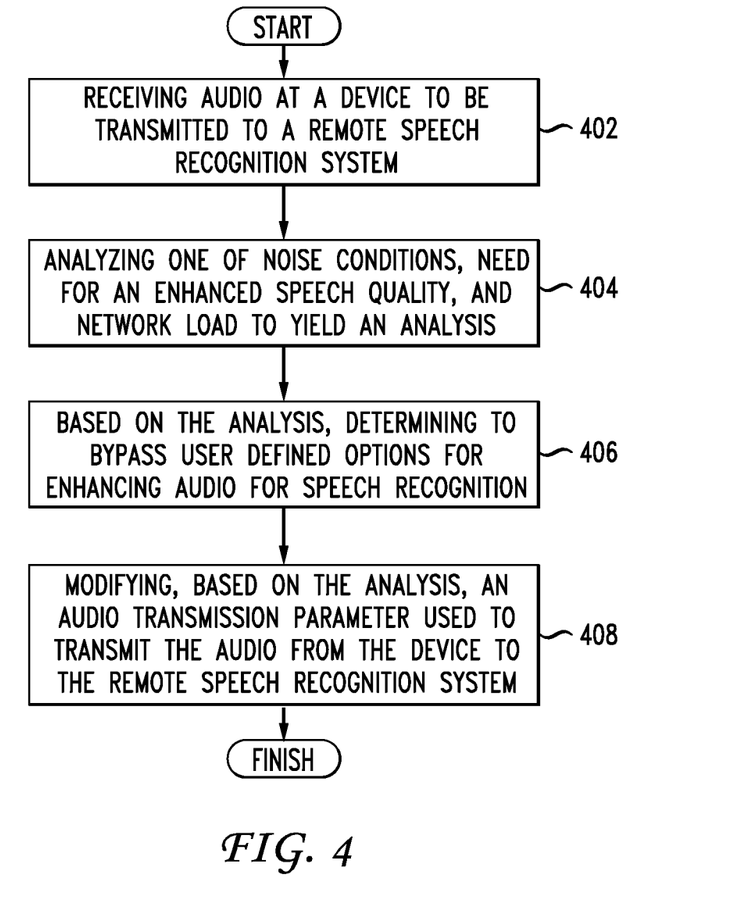
FIG. 4 illustrates an example method embodiment.
Figure 5:
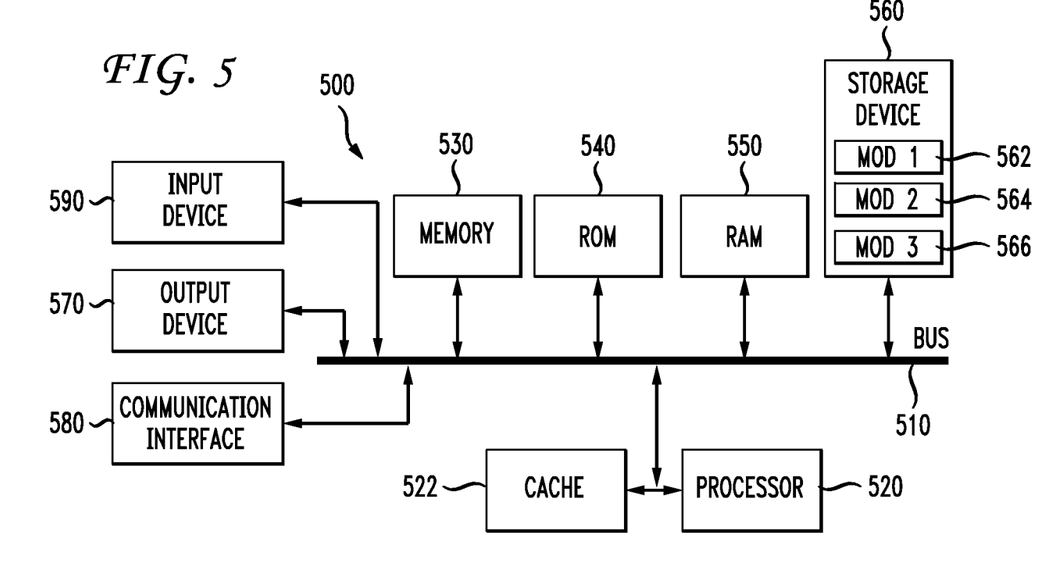
FIG. 5 illustrates an example system embodiment.

Having disclosed some basic system components and concepts, the disclosure now turns to the exemplary method embodiment shown in FIG. 4. For the sake of clarity, the method is described in terms of an exemplary system 500 as shown in FIG. 5 configured to practice the method. The steps outlined herein are exemplary and can be implemented in any combination thereof, including combinations that exclude, add, or modify certain steps.

FIG. 4 illustrates an example method embodiment for processing speech. An example system configured to practice the method can receive audio at a device to be transmitted to a remote speech processing system (402). The remote speech processing system can perform speech recognition, natural language understanding, speaker recognition, or other tasks related to speech processing. The system can analyze one of noise conditions, need for an enhanced speech quality, and network load to yield an analysis (404). The analysis can be based on a user profile stored in a network, a network status, a device battery level, capabilities and/or features of the device, and so forth. The analysis can produce a composite score that weights multiple factors that are important to a particular task. For example, the analysis can be based on data associated with a sampling rate and level of data compression.

Based on the analysis, the system can determine to bypass user-defined options for enhancing audio for speech processing (406). The system can modify, based on the analysis, an audio transmission parameter used to transmit the audio from the device to the remote speech processing system (408). Audio transmission parameters can include an amount of coding, a chosen codec, codec settings, a number of audio channels, which audio channels to use, whether to transmit audio data from multiple microphones, whether to transmit data in serial or in parallel, and so forth. In one embodiment, the system can select audio channels in a symmetric manner, so that an even amount of bandwidth is used for or a same or similar codecs and codec settings are applied to each channel. In another embodiment, the system can select audio channels in an asymmetric manner. For example, the system can determine that a particular audio channel may be more valuable or may provide more useful information that should be preserved when coding. Thus, the system can devote additional bandwidth for that audio channel while still transmitting a reduced bandwidth version of one or more other audio channels or data from other microphones. The system can apply this approach to other audio transmission parameters as well, so that different audio channels are transmitted with different audio transmission parameters according to their various priority levels. The system can determine a respective priority level for each of a set of audio channels from separate microphones, and encode each of the set of audio channels according to the respective priority level. Further audio data from different microphones can be transmitted with separate coding features in a serial or parallel fashion.

The PSE 208 can track users' voices over time and adjust or retrain their respective user profiles when substantial changes in their voices are detected. For example, when the audio is a voice of a user, the system can track the voice of the user over time, and adjust a profile of the user upon detecting a change in the voices that exceeds a threshold.

In one variation, the SBM 214 can continuously track noise levels and decide whether to transmit more audio channels to the PSE 208 to enhance audio signal clarity. Further, the SBM 214 can alter the audio capturing configuration on the device 204 in order to send a smaller amount of data to the PSE 208, thereby conserving additional channel bandwidth. This can be important when the network load is high. A speech-based application on the device 204 can request "speech fingerprints" transparently to the user, or without requiring the user to take any further action. Since the stored user profile 124 is device independent, this service can improve the interaction between any registered users with other systems such as in-car communication, voice interactive television set-top boxes, "ambient house" systems, and so forth. The PSE 208 can improve the signal clarity or quality of captured speech based on a user 124 profile that is stored in the network-based location, which can be retrieved each time the user attempts to communicate with other users or with speech-enabled systems. In other words, the improved signal clarity or quality can provide benefits to other entities with which the user is speaking via the device 204, whether the other entities are other humans or some kind of automatic dialog system.

Various embodiments of the disclosure are described in detail herein. While specific implementations are described, it should be understood that this is done for illustration purposes only. Other components and configurations may be used without parting from the spirit and scope of the disclosure. A brief description of a basic general purpose system or computing device in FIG. 5 which can be employed to practice the concepts, methods, and techniques disclosed is illustrated.

An exemplary system and/or computing device 500 includes a processing unit (CPU or processor) 520 and a system bus 510 that couples various system components including the system memory 530 such as read only memory (ROM) 540 and random access memory (RAM) 550 to the processor 520. The system 500 can include a cache of high speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various operations or actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 5 562, module 2 564, and module 3 566 stored in storage device 560, configured to control the processor 520 as well as a special-purpose processor where software instructions are incorporated into the processor. The processor 520 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 560 can include software modules 562, 564, 566 for controlling the processor 520. The system 500 can include other hardware or software modules. The storage device 560 is connected to the system bus 510 by a drive interface. The drives and the associated computer-readable storage media or devices provide nonvolatile storage of computer-readable instructions, data structures, program modules and other data for the computing device 500. In one aspect, a hardware module that performs a particular function includes the software component stored in a tangible computer-readable storage medium or device in connection with the necessary hardware components, such as the processor 520, bus 510, display 570, and so forth, to carry out a particular function. In another aspect, the system can use a processor and computer-readable storage medium or device to store instructions which, when executed by the processor, cause the processor to perform a method or other specific actions. The basic components and appropriate variations can be modified depending on the type of device, such as whether the device 500 is a small, hand-held computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 560, other types of computer-readable storage devices which can store data that are accessible by a computer, such as magnetic cassettes, flash memory cards, digital versatile disks (DVDs), cartridges, random access memories (RAMs) 550, read only memory (ROM) 540, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 520. The functions these blocks represent may be provided through the use of either shared or dedicated hardware, including, but not limited to, hardware capable of executing software and hardware, such as a processor 520, that is purpose-built to operate as an equivalent to software executing on a general purpose processor. For example the functions of one or more processors presented in FIG. 5 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 540 for storing software performing the operations described below, and random access memory (RAM) 550 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 500 shown in FIG. 5 can practice all or part of the recited methods, can be a part of the recited systems, and/or can operate according to instructions in the recited tangible computer-readable storage devices. Such logical operations can be implemented as modules configured to control the processor 520 to perform particular functions according to the programming of the module. For example, FIG. 5 illustrates three modules Mod1 562, Mod2 564 and Mod3 566 which are modules configured to control the processor 520. These modules may be stored on the storage device 560 and loaded into RAM 550 or memory 530 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code means in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
    receiving, at a device and at a first time, audio to be transmitted to a remote speech processing system;
    identifying an audio quality associated with the audio;
    transmitting the audio to the remote speech processing system according to an audio transmission parameter which identifies a number of audio channels to use for transmitting the audio;
    detecting, at the device and at a second time after the first time, a change in the audio quality;
    modifying the audio transmission parameter based on the change in the audio quality, to yield a modified audio transmission parameter which identifies a new number of audio channels to use for transmitting addition audio; and
    transmitting the additional audio to the remote speech processing system according to the modified audio transmission parameter.

2. The method of claim 1, wherein the audio transmission parameter comprises one of an amount of coding and a chosen codec.

3. The method of claim 1, wherein the audio transmission parameter further indicates data associated with coding.

4. The method of claim 1, wherein the audio transmission parameter is further based on one of a user profile stored in a network and a battery level.

5. The method of claim 1, wherein the change in the audio quality is caused by a network load.

6. The method of claim 1, wherein modifying the audio transmission parameter further comprises:
    determining a respective priority level for each of a plurality of audio channels from separate microphones; and
    encoding each of the plurality of audio channels according to the respective priority level.

7. The method of claim 1, wherein the audio comprises a voice of a user, the method further comprising:
    tracking the voice of the user over time; and
    adjusting a profile of the user upon detecting a change in the voices that exceeds a threshold.

8. A system comprising:
    a processor; and
    a computer-readable storage device storing instructions which when executed by the processor, cause the processor to perform operations comprising:
        receiving, at a device and at a first time, audio to be transmitted to a remote speech processing system;
        identifying an audio quality associated with the audio;
        transmitting the audio to the remote speech processing system according to an audio transmission parameter which identifies a number of audio channels to use for transmitting the audio;
        detecting, at the device and at a second time after the first time, a change in the audio quality;
        modifying the audio transmission parameter based on the change in the audio quality, to yield a modified audio transmission parameter which identifies a new number of audio channels to use for transmitting addition audio; and
        transmitting the additional audio to the remote speech processing system according to the modified audio transmission parameter.

9. The system of claim 8, wherein the audio transmission parameter comprises one of an amount of coding and a chosen codec.

10. The system of claim 8, wherein the audio transmission parameter further indicates data associated with coding.

11. The system of claim 8, wherein the audio transmission parameter is further based on one of a user profile stored in a network and a battery level.

12. The system of claim 8, wherein the change in the audio quality is caused by a network load.

13. The system of claim 8, wherein modifying the audio transmission parameter further comprises:
    determining a respective priority level for each of a plurality of audio channels from separate microphones; and
    encoding each of the plurality of audio channels according to the respective priority level.

14. The system of claim 8, wherein the audio comprises a voice of a user, the operations further comprising:
    tracking the voice of the user over time; and
    adjusting a profile of the user upon detecting a change in the voices that exceeds a threshold.

15. A computer-readable storage device storing instructions which when executed by a processor, cause the processor to perform operations comprising:
    receiving, at a device and at a first time, audio to be transmitted to a remote speech processing system;
    identifying an audio quality associated with the audio;
    transmitting the audio to the remote speech processing system according to an audio transmission parameter which identifies a number of audio channels to use for transmitting the audio;
    detecting, at the device and at a second time after the first time, a change in the audio quality;

modifying the audio transmission parameter based on the change in the audio quality, to yield a modified audio transmission parameter which identifies a new number of audio channels to use for transmitting addition audio; and transmitting the additional audio to the remote speech processing system according to the modified audio transmission parameter.

16. The computer-readable storage device of claim 15, wherein the audio transmission parameter comprises one of an amount of coding and a chosen codex.

17. The computer-readable storage device of claim 15, wherein the audio transmission parameter further indicates data associated with coding.

18. The computer-readable storage device of claim 15, wherein the audio transmission parameter is further based on one of a user profile stored in a network and a battery level.

19. The computer-readable storage device of claim 15, wherein the change in the audio quality is caused by a network load.

20. The computer-readable storage device of claim 15, wherein modifying the audio transmission parameter further comprises:

determining a respective priority level for each of a plurality of audio channels from separate microphones; and encoding each of the plurality of audio channels according to the respective priority level.

* * * * *